Aug. 25, 1953 W. E. HUNT 2,650,045
AIRCRAFT
Filed Nov. 10, 1950 4 Sheets-Sheet 1
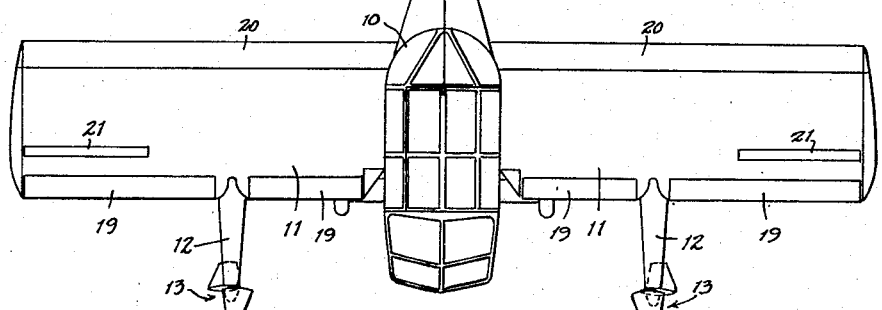
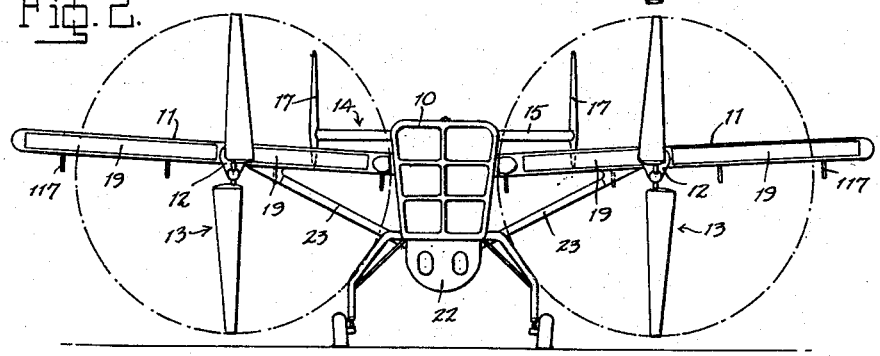
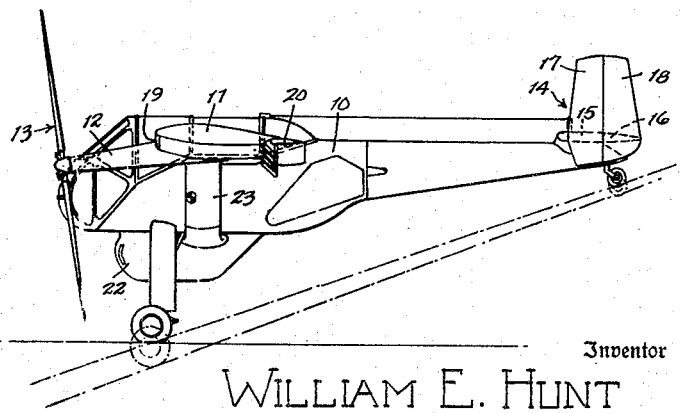
Inventor
WILLIAM E. HUNT
By
Attorney

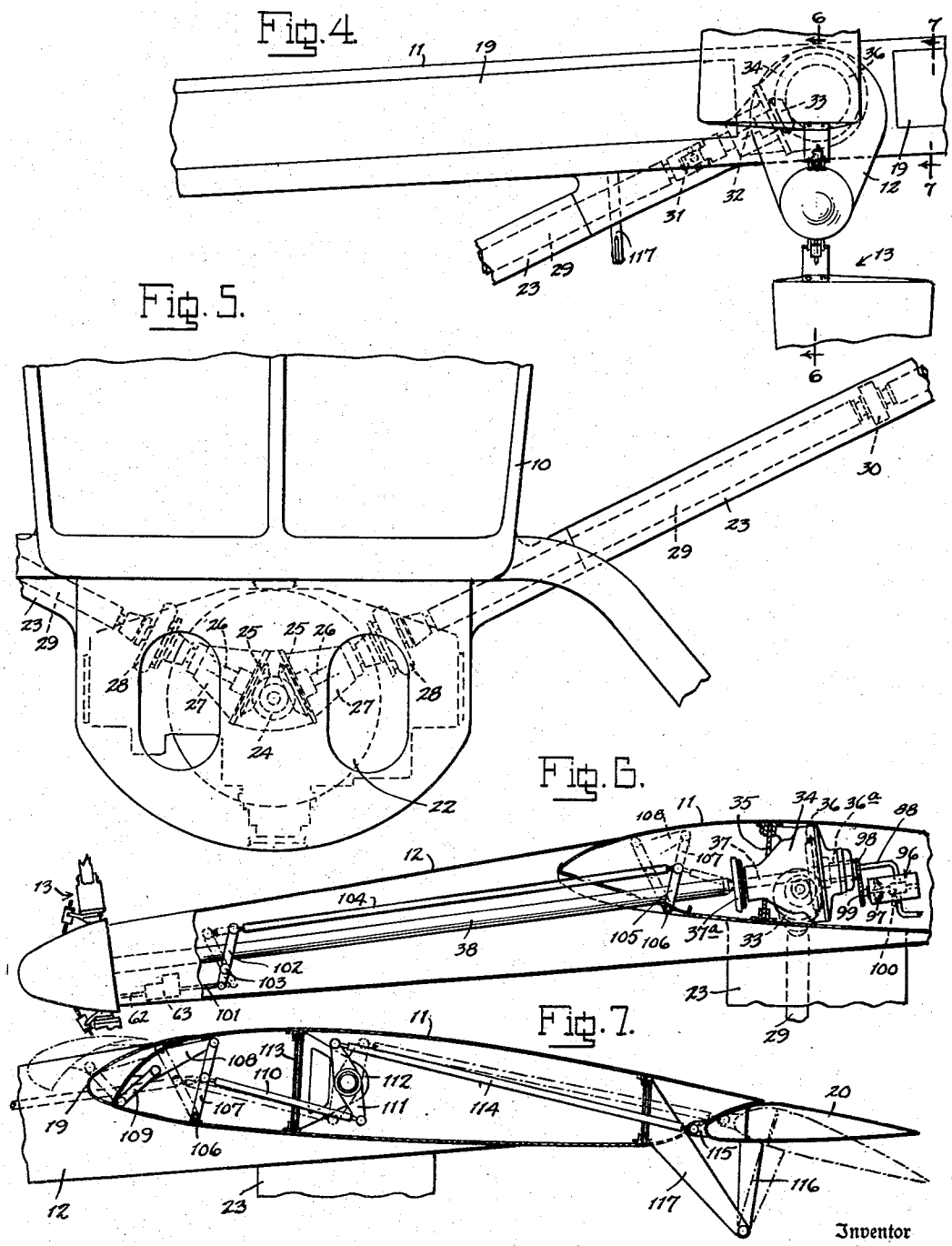

Aug. 25, 1953        W. E. HUNT        2,650,045
AIRCRAFT
Filed Nov. 10, 1950        4 Sheets-Sheet 3
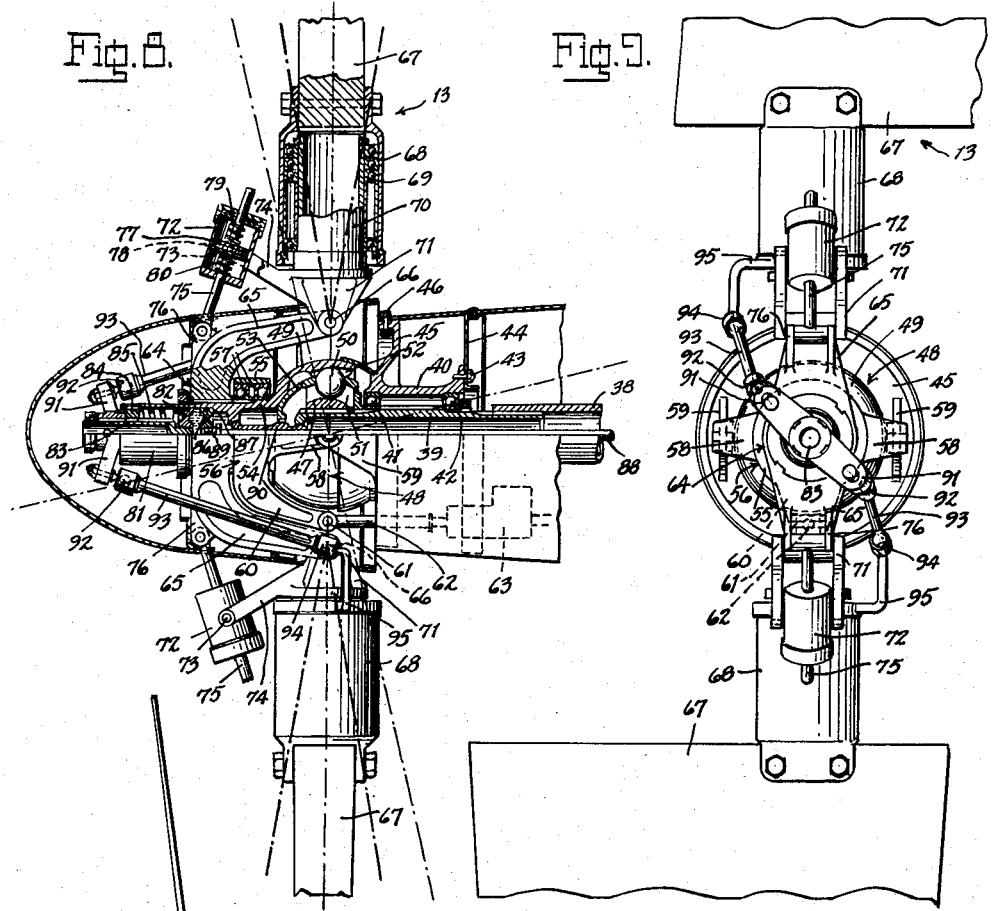
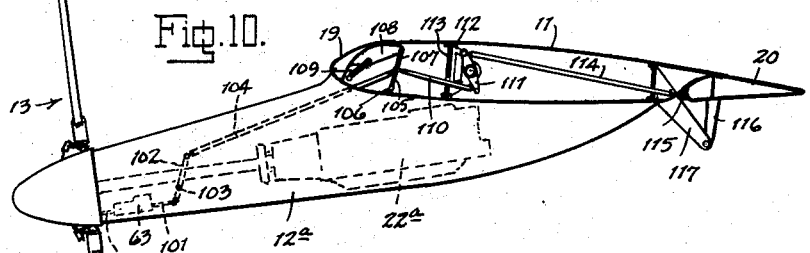
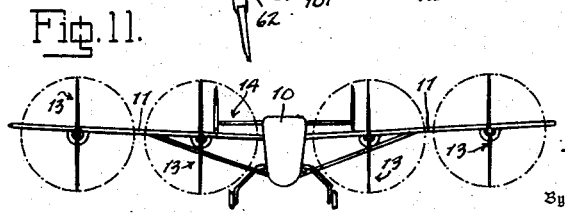
Inventor
WILLIAM E. HUNT
By
Attorney

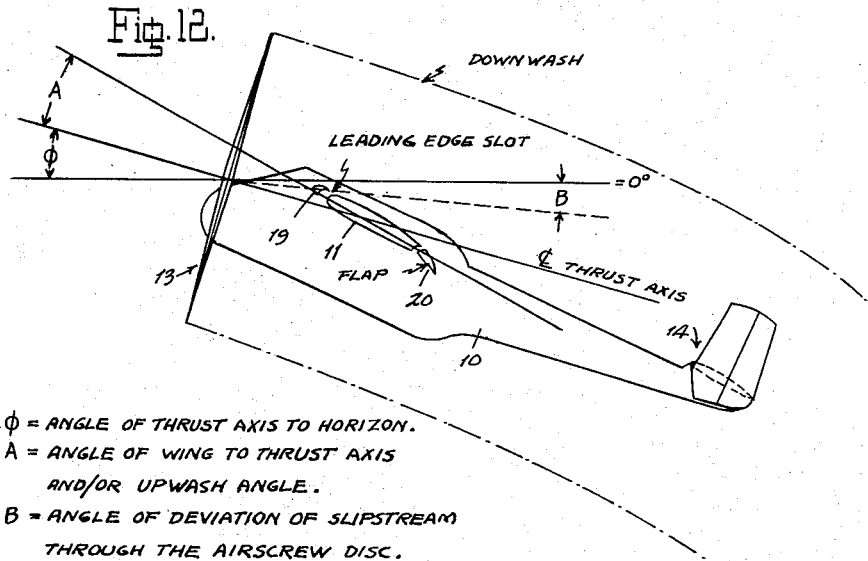
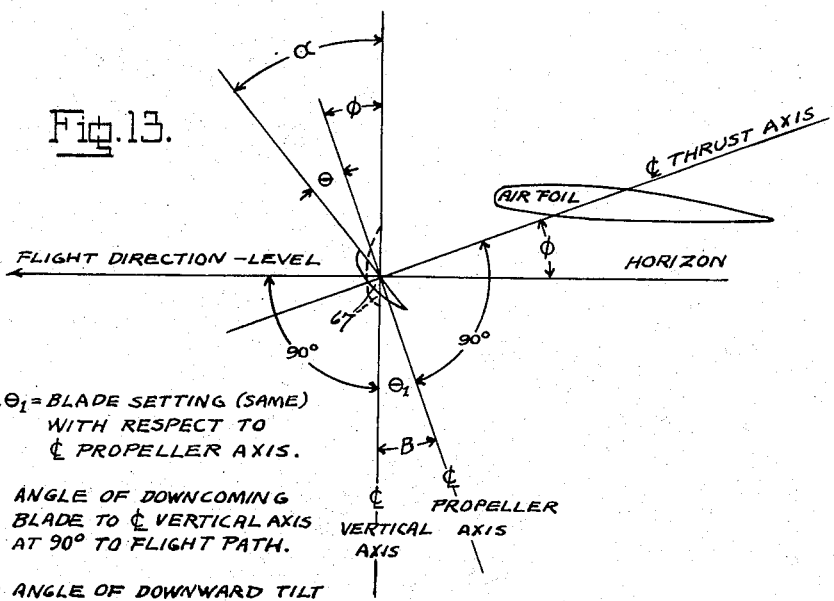

Patented Aug. 25, 1953

2,650,045

UNITED STATES PATENT OFFICE 2,650,045

AIRCRAFT

William E. Hunt, Brooklyn, Conn., assignor, by direct and mesne assignments, to Wiggins-Hunt Engineering Corporation, Norwood, Mass., a corporation of Massachusetts Application November 10, 1950, Serial No. 194,999

9 Claims. (Cl. 244—13)

The present invention relates to aircraft, and more particularly to an improvement in aircraft of the type employing the principle disclosed in the U. S. Reissue Patent No. 19,932, to Harold Bolas, reissued April 21, 1936 (original Patent No. 1,933,307, dated October 31, 1933). According to this principle, hereinafter referred to as the power-lift principle, large diameter slow-turning propellers, at least two being required, are placed along and well in front of the leading edge of the fixed lifting surfaces with their thrust axes tiltable at a downward and forward positive angle to the chord of the wing so that the slipstream from the propellers will at all times pass over a substantial portion of the wing and tail surfaces causing the slip-stream to be deflected downward to create increased lift at very slow forward speeds while at the same time obtaining adequate control.

In the aircraft as disclosed in the Bolas patent the propellers are carried by individual engines and these are adjustably mounted to vary the angle of the thrust axes with respect to the wing. Also the propeller blades are rigid with respect to the propeller disc. These features as disclosed in the Bolas patent result in two distinct obstacles to the use of the power-lift principle in modern high-speed aircraft, the one from an unpractical mechanical standpoint which results from the manner of changing the thrust angle, and the aerodynamical in that the resultant induced flow over the fixed lifting surfaces is directly influenced by the manner of changing the thrust angle. It is my purpose to overcome these obstacles by the improved means described hereinafter. I shall first deal with the mechanical aspect. For modern high-speed aircraft it is necessary that means be provided for tilting the thrust axes up or down while the aircraft is either airborne or not. The direct mounting of the propellers, especially large propellers upon the individual tiltable engines in modern high powered aircraft would result in a complicated power plant installation, not to mention the excessive weight involved in this installation, but also of the very long landing gear required to give adequate ground clearance. Also the gyroscopic forces set up by tilting the propeller axis is considerable and, if applied fast enough, could cause serious damage to the rigid propeller as well as its supporting structure, there being no provision made in such rigid propellers for dissipating gyroscopic forces due to rapid changes in thrust axis angle. Excessive vibration would also be set up under these conditions. The principal reason for this is that at high forward speeds of say 200 M. P. H., and up, a large diameter, slow-turning propeller, when tilted downward at an optimum angle for slow speed conditions, is actually acting at a similar angle of yaw with the flight path. In other words, the angle of the upcoming blade is operating at a greater angle than the downcoming blade and the blades will therefore be producing periodically unequal and opposite values of lift and/or thrust with respect to each other and thereby cause excessive vibration.

It is proposed in the present invention to provide for the downward tilting of the thrust axis of the propeller by means of a constant speed joint having its axis coincident to the intersection of the thrust axis and the propeller disc, so that change of angle may be accomplished by relatively little force and without the problem of moving a relatively large static weight, as would be the case in adjusting the position of a power plant or a large propeller supporting structure and at the same time maintaining the correct relationship between the propellers and wing.

It is further proposed to provide propeller blades hingedly attached to the propeller hub to permit a limited flapping movement of the blades to take place, so that the gyroscopic forces set up by the tilting of the propeller axis will be dissipated, without creating destructive stresses upon the propeller blades and supporting structure.

It is further proposed to provide variable pitch blades and a constant speed propeller, to the end of further dissipating vibratory fluctuations.

In order to attain the most efficient use of the power-lift principle, I propose to introduce certain aerodynamic improvements over the original Bolas conception of the power-lift principle. I propose that the diameter of the propellers measure at least twice the length of the wing chord and that said propellers be placed well forward of the leading edge of said wing, the minimum amount being at least one chord length from the center of pressure of said wing. I further propose, as the angle of incidence of the wing is increased with respect to the horizon, similarly so should the angle of the thrust axes of the propellers be increased downwardly with respect to the wing. Also, I propose that the lift increasing devices be so co-related with the increase in incidence of the wing and/or change of thrust angle as to maintain the optimum relationship between angle of wing incidence, angle of wing lift increasing devices, and thrust axes and, by the same token, all the foregoing co-related with the pitch angle of the propeller blades. However, in changing the propeller thrust angle, it is also most important not only to maintain the wing in a substantially unvarying state of induced flow, but also the tail surfaces as well. In other words, the wing and/or wings are, according to the invention, at all times substantially in juxtaposition with the propellers. This is accomplished by placing the angular thrust changing pivotal point of each propeller coincident with the center of the plane of rotation of the propeller disc, with the result that the pivotal point is so placed as to obtain the optimum location of the thrust axes throughout the range of both high and low speed conditions.

The employment of a constant speed joint at the thrust axis pivotal point is directly responsable for the smooth areodynamic operation of the driven propeller blades. An ordinary gimbal and/or Carden type universal joint would be entirely useless since its amplitude of angular speed change increases with increased angular misalignment. This condition would cause the propeller blades to speed up and slow down twice per revolution and at such magnitude as to cause excessive vibration and/or fatigue. Another important and necessary feature is the incorporation of a fully feathering as well as a variable pitch type of propeller. Variable pitch is necessary in order to satisfy both the slow speed and high speed conditions of flight. For slow speed flight, in order to produce maximum slip-stream velocity, the propeller blades are set at low pitch for maximum rotational speed, and at correspondingly higher angular settings for high speed conditions. Fully feathering blades are necessary in the case of power failure since unfeathered, large diameter, geared-down, hinged blades would create so much resistance as to cause excessive blade stresses as well as a too rapid rate of vertical descent.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a plan view of an aircraft embodying the invention.

Fig. 2 is a front elevation.

Fig. 3 is a side elevation.

Fig. 4 is a fragmentary front elevation of the wing of the aircraft on an enlarged scale showing the mounting of the hub of one of the propellers and the driving connection through the wing strut from the engine.

Fig. 5 is a fragmentary front elevation of the engine casing showing the connection of the drive shafts through the wing struts.

Fig. 6 is a fragmentary longitudinal sectional view, taken along the line 6—6 of Fig. 4.

Fig. 7 is a longitudinal sectional view, taken along the line 7—7 of Fig. 4.

Fig. 8 is a vertical sectional view of the propeller hub showing the constant speed joint.

Fig. 9 is a front elevation of the propeller hub with the cowling removed.

Fig. 10 is a longitudinal sectional view of a modified form of the invention, where each of the propellers is provided with an individual power plant.

Fig. 11 is a front elevation showing an aircraft embodying the invention and provided with four propellers.

Fig. 12 is a schematic side elevation showing the principal lift increasing elements of the aircraft.

Fig. 13 is a diagram showing the different angles of the upmoving and downmoving blades of the propeller with the thrust axis at an angle to the line of flight.

Similar reference characters indicate corresponding parts throughout the several figures of the drawings.

Referring to the drawing and more particularly to Figs. 1 to 3, a suitable type of aircraft employing my invention comprises a fuselage 10 provided at each side with a rigidly mounted wing 11 provided at an intermediate point along its leading edge with an outrigged propeller supporting spar or beam 12, in the form of a forwardly tapered housing tube having a suitable reinforcing frame therein and disposed at a forwardly and downwardly inclined positive angle to the chord of the wing. A large diameter, slow turning propeller 13 is carried at the forward end of the beam by means of a constant speed joint, hereinafter more fully described, and by means of which the thrust axis of the propeller may be varied downwardly with respect to the wing chord in conjunction with the wing lift increasing devices. The fuselage is provided at its rearward end with a tail or empennage unit, indicated generally as 14, and comprising a stabilizer 15, elevator 16, fins 17 and rudder 18.

In general design the aircraft follows the principle of the aircraft disclosed in the Bolas Reissue Patent No. 19,932, except for the fact that, whereas in the Bolas patent the propeller thrust axis is varied by rotating the power plant about an axis point athwart the aircraft and approximately at the center of gravity of the power plant, and thereby destroying the optimum relationship between wing and propeller. The propeller of the present invention is tiltable to vary its thrust axis downwardly about a point coinciding with the propeller disc. In common with the principle disclosed in the Bolas patent, the aircraft of the present invention has the major portion of both the wings and the control surfaces of the wings as well as the major portion of the control surfaces of the tail unit in all conditions of flight in the slip-stream of the propellers as clearly indicated in Fig. 2.

Each of the wings is provided at its forward edge with slats 19 and at its trailing edge with a flap 20, which is adapted to be operated in connection with the leading edge slats by interconnection means between them, hereinafter to be more fully described. As shown in Fig. 1 each of the wings is provided with a spoiler 21, but it will be understood that ailerons or other suitable control elements may be employed if desired.

In the aircraft as illustrated in Figs. 1 to 3 the two propellers are driven by a single power plant, indicated generally as 22, and which is mounted at the underside of the forward part of the fuselage at a suitably balanced point with respect to the center of gravity of the aircraft, the drive shafts from the power plant to the drive shafts of the propellers being extended through suitably faired supporting struts 23 connected between the sides of the fuselage and the undersides of the wings.

A most important consideration when embodying the power-lift principle, which calls for at least two widely spaced propellers, is the central location of all the major static weights, thus reducing mass inertia to a minimum, in order to maintain adequate lateral and longitudinal control during all conditions of flight. In flight tests of the original model of the Bolas invention, it was found that the weight of the two engines placed so far outward and forward caused excessive lateral and longitudinal inertia during slow speed flight. Thus, the need for a centrally located power source.

As shown in Fig. 10 a power plant 22a may be provided for each propeller within a supporting spar or beam structure 12a, similar to the supporting spar or beam 12 in its general disposition with respect to the wing, but suitably enlarged to accommodate the power plant. As shown in Fig. 11 the wing may be provided with multiple propellers, and in this case each of the propellers may be provided with individual power plants, or the several propellers may be driven by known drive connections from a single engine or an engine common to two or more of the propellers.

The engine 22 (Fig. 5) is provided upon its crank shaft with a beveled drive pinion 24 which meshes with a pair of beveled gears 25—25, one for driving each of the propellers, these beveled gears having their shafts 26—26 journaled in suitable housings 27—27 secured to the engine body. Each shaft 26 is connected by a flexible coupling 28 to a shaft 29 extending through the strut 23 and supported at an intermediate point in a self-aligning bearing unit 30, the upper end of the shaft being connected by a universal joint 31 (Fig. 4) of the gimbal type to the shaft 32 of a bevel pinion 33 journaled in a gear housing 34 supported within the wing 11 upon a bulkhead plate 35 (Fig. 6) secured within the wing, the gear housing being in axial line with the axis of the spar or beam 12. The pinion 33 meshes with a bevel gear 36 having its tubular hub 36a journaled in the housing 34, and to which there is splined a tubular drive shaft 37 journaled in the housing 34 and connected by a flexible coupling 37a to a tubular drive shaft 38 extending through an opening in the forward end of the wing and axially through the spar or beam 12. Its forward end is splined to a tubular shaft extension 39 (Fig. 8) rotatably supported in a tubular bearing support 40 upon ball bearing units 41 and 42, the bearing support 40 being secured at its rearward end by bolts 43 to a bulkhead 44 bolted within the forward end of the spar or beam 12, and being provided at its forward end with a circular flange 45 secured by bolts 46 within the forward end of the spar or beam 12.

Upon the forward end of the shaft extension 39 there is splined the inner spherical element 47 of a constant speed joint 48 (Fig. 9), the outer spherical member 49 of which is adapted to be driven from the inner member 47 by a series of balls 50 disposed in pockets 51 of the inner member 47 and engaged between ribs 52 provided upon the inner side of the outer member 49. A ball separator 53 embraces the balls and is adapted to have pivotal movement with the outer member to maintain the balls in the plane of rotation of the outer member while permitting the balls to move upon the inner member. For this purpose the inner member has its center slightly offset at one side of the pivotal axis of the outer member while the inner spherical surface of the outer member has its center offset at the other side of the pivotal axis of the outer member, so that upon pivotal movement of the outer member the balls remain in contact with the spherical surfaces of the inner and outer members, with the result that the outer member is driven at a constant speed with respect to the speed of the drive shaft without fluctuation such as occurs with a universal joint of the gimbal type.

The outer member 49 is provided with a forwardly extending tubular shaft portion 54 (Fig. 8) which is rotatably mounted within a ring portion 55 of a tilting member 56 by means of a pair of ball bearing units 57—57, the tilting member being provided at its sides with forwardly extending arms 58—58 pivotally supported by trunnion bearings in a pair of bracket members 59—59 formed upon the circular flange portion 45 of the bearing member 40, the transverse axis of the trunnion supports being coaxial with the axis of the constant speed joint. The tilting member 56 is also provided at its underside with a rearwardly extending arm 60 pivotally connected at 61 to a push-pull rod 62 of an electrically operated screw jack unit 63, the operation of which is adapted to move the rod 62 forwardly or rearwardly to tilt the outer member 49 of the constant speed joint and thus change the thrust axis of the propeller, as will presently more fully appear.

Forwardly of the tilting member 56 there is splined upon the shaft extension 54 of the constant speed joint the hub portion of a blade supporting member 64 having a pair of arms 65—65 which extend rearwardly about the joint and have pivot bearings 66 at their ends disposed in a plane of rotation coincident to the axis of the joint. In the present illustration the propeller is shown as provided with a pair of diametrically aligned blades, but it will be understood that it may have three or more blades in which case the blade supporting member 64 will be provided with a corresponding number of equally spaced arms.

Each propeller blade 67 is secured at its inner end to a cuff member 68 rotatably mounted by means of thrust bearings 69 upon a blade axle 70, upon which the blade is adapted to be turned to vary its pitch. The axle member is provided at its inner end with a yoke 71 pivotally mounted upon the bearing end 66 of the arm 65 to permit limited flapping movement of the blade assembly, as shown by the heavy dot-and-dash lines in Fig. 8.

The flapping of the blades is limited and controlled by a self-centering unit provided for each of the blades, and which comprises a hydraulic cylinder 72 pivotally connected by trunnion supports 73—73 to fork arms 74—74 extended upwardly and forwardly from the yoke portion 71 of the blade axle, the hydraulic cylinder being slideable upon an axially disposed guide rod 75 pivotally mounted at its lower end upon a bearing bracket 76 formed upon the arm 65. A piston 77 having bleed holes 78 therethrough is secured upon the rod 75 within the cylinder, and centering springs 79 and 80 are provided between each side of the piston and the ends of the cylinder to normally centralize the cylinder and/or propeller blades when they are not rotating. In practice, the cylinder is filled with hydraulic fluid which will have restricted passage through the bleed holes 78 from one side of the piston to the other so as to dampen the centering spring action as the force of the flapping blade is applied thereto.

For the purpose of varying the pitch of the propeller blades a hydraulic cylinder extension portion 81 is provided at the outer end of the tubular shaft portion of the outer member 49 of the constant speed universal point, and slideably engaged within this cylinder is a hydraulic piston 82 having a hub portion 83 projected outwardly beyond the end of the cylinder and guided in a bearing ring 84 secured in the outer end of the cylinder. A spring 85 interposed between the piston and the ring 84 normally presses the piston inwardly. The inner end of the cylinder is closed by a slidably engaged sealing disc 86 seated against an annular shoulder 87, hydraulic fluid being admitted to the cylinder by a flexible tube 88 having an outlet fitting 89 secured centrally within the disc 86. The tube 88 is supported within the constant speed joint in a guide sleeve 90 having pivotal engagement with the end of the drive shaft extension 39, and extends through the tubular drive shaft 38 to a control valve means presently to be more fully described.

Upon the outer end of the hub portion 83 of the piston 82 there is provided a pair of projecting arms 91—91, one for each blade, each arm being connected by a ball joint 92 to a rod 93 which is connected by ball joint 94 to an arm 95 extending radially from the blade cuff 68, and whereby reciprocatory movement of the piston imparts turning movement to the cuff to change the pitch of the propeller blade.

The tube 88 extends through the tubular hub 37 of the gear 36, as shown in Fig. 6, where it is connected to a control valve unit 96 which includes a fly-ball governor 97 driven by the gear 36 through gears 98 and 99 respectively provided upon the gear 36 and the shaft of the governor. Movement of the governor through changing speed of the gear 36 actuates the valve element 100 to control the admission of hydraulic fluid to the blade pitch changing mechanism, and thus the pitch of the blades is varied in accordance with the speed of rotation of the propeller drive shaft and a constant speed condition is maintained. Governor controlled valve units are well known so that a further detail illustration and description is not deemed necessary.

As shown by the light dot-and-dash lines in Fig. 8 the downward and forward positive angle of the propeller thrust axis to the wing chord may be increased through operation of the jack unit 63 causing the outer member 49 of the constant speed universal joint to tilt downwardly. During the transition movement when in flight gyroscopic forces upon the blades, which might result in serious damage in the case of rigid blades, are dissipated by the ability of the blades to flap, the flapping limit of the blades being shown by the heavy dot-and-dash lines in Fig. 8.

While the control means for the jack unit 63 for changing the thrust axis and the control means for the leading edge slats 19 and the flaps 20 may be independent of each other, for optimum results it is preferred that interconnection means be provided between the jack unit and the operating means for the leading edge slats and flaps, so that with an increase in the downward thrust axis there is a related opening of the leading edge slats to increase the leading edge slot area and a related increase in the deflected angle of the flaps, the ratio between these related adjustments being such that an optimum relationship will result between the thrust axis angle, the slot opening, flap angle, and the angle of incidence of the wing to the horizon. For this purpose the jack unit 63 (Figs. 6 and 10) is provided with a rod 101 which moves proportionately with the thrust angle changing movement of the rod 62, and which is connected to the lower end of a lever 102 pivotally mounted at 103 within the spar or beam 12 and 12a. The lever 102 is pivotally connected at its upper end to the forward end of a rod 104, which in turn is pivotally connected at its rearward end to a lever 105 secured at its lower end within the wing to a torque tube 106 mounted for rotation along the wing span. Secured to the torque tube at suitable intervals are the lower ends of a series of levers 107 which are suitably located to operate the leading edge slats 19 and the flaps 20.

The leading edge slots are provided with plates 108 rigidly secured thereto, and which are supported for swinging movement upon a lever 109 pivotally secured at its upper end intermediate the lower edge of the plate 108 and pivotally mounted at its lower end within the leading edge of the wing. The rearward end of the plate 108 is pivotally connected to the upper end of the lever 107, so that as the lever 107 is swung from its normal slat closing position, as shown in full lines Fig. 7, to the dotted line position, the slat is moved forwardly to provide a slot at the leading edge of the wing.

The lever 107 is pivotally connected intermediate its ends to the forward end of a rod 110 which is pivotally connected to the lower arm of a bellcrank lever 111 mounted upon a bracket 112 secured to the bulkhead frame structure 113 of the wing, the upper arm of this lever being pivotally connected to the forward end of a rod 114 which is pivotally connected at its rearward end to a bracket 115 secured upon the forward end of the flap 20. The flap is supported for swinging movement at the rearward end of the wing upon a series of arms 116 projecting downwardly from the flap and pivotally mounted upon brackets 117 projecting rearwardly and downwardly from the rearward end of the wing, so that as the rod 114 is moved rearwardly from its full line position, Fig. 7, to the dotted line position, the flap is swung to a downward tilted angle.

In Fig. 12 I have shown diagrammatically, in an attitude of slow-speed flight, an aircraft embodying the principle of obtaining increased lift by the action of the slip-stream of the propeller upon the control surfaces of the wing and tail as disclosed in the Bolas Reissue Patent 19,932, and as embodied in the present invention. In this illustration the principal lift increasing elements are shown in their relative positions for slow-speed flight. If ($\phi$) is the inclination of the propeller axis to the wind, with the propeller in front of the wing, the upwash angle (A) ahead of the wing will affect the incidence of the wind on the propeller, and therefore affect the downwash caused by the lift of the inclined propeller. The slip-stream then passes the wing and increases the velocity of air passing over it, but at the same time decreases the angle of incidence of the portion of the wing in the slip-stream by angle (B) so long as $\phi$ plus B is positive (as shown). Therefore $\phi + A - B =$ actual angle of incidence of the wing to the resultant increased air velocity over the wing. It is, therefore, possible to attain a large angle of incidence ($\phi$) of the propeller axis of thrust and still maintain a high rate of slip-stream velocity over the wing.

This positive change in the lift of a wing passing through an air jet of this type has been proved to be extraordinarily great. Especially is this so when the diameter of the air jet is large compared with the wing chord. The effect is further augmented by the use of leading edge slots and trailing edge flaps. This, in essence, is the principle employed herein which allows for very slow takeoff, flight and landing speeds, as well as for hovering flight. It is pointed out that the ratio of the air jet diameter to the wing chord is important. If the slip-stream jet diameter is less than twice the wing chord, or the wing lies high in the jet, then the wing will not develop the full lift due to the increase in velocity since the depth of air having the increased velocity is too small. By providing the air jet of a diameter at least two times greater than the length of the wing chord and by placing the leading edge of the wing substantially in line with the center of the jet, the optimum lift is attained. It will also be noted that the tail surfaces are immersed at all times in the slip-stream. This is essential in order to maintain control at high angles of incidence during slow speed flight.

In Fig. 13 there is illustrated the change in the angles of the upcoming and downcoming blades with respect to the direction of the wind when the propeller axis is at a tilted angle thereto. From this diagram it will be seen that the angle of the upcoming blade with respect to the airstream is the product of the blade angle itself ($\theta$) plus the angle of tilt, whereas, the downcoming blade is the product of the angle of the blade ($\theta_1$) minus the angle of tilt. This action, therefore, periodically loads and unloads each blade causing excessive vibratory and bending stresses in the blades. By hinging the blades at their roots to allow them to flap, as shown in Fig. 9, these bending stresses will be automatically relieved and dissipated. In other words fixed blades would have to take bending stresses due to yaw, plus bending stresses due to gyroscopic forces, in addition to tension or centrifugal forces generated by the rotation of the blade mass around its rotational axis.

While the propeller and its blades are turning in a steady condition no gyroscopic forces exist. However, the moment this equilibrium is disturbed by changing the axis of rotation the following occurs. Due to centrifugal force the blades are constrained to remain in a given plane of rotation and when this plane of rotation is altered by tilting the rotational or thrust axis the blades will tend to counteract the shifting of the rotational or thrust axis by tending to remain in their old plane of rotation. Obviously, if the blades are rigidly connected to their rotational centers these conditions would produce bending in the blades. According to the present invention the blades are hingedly mounted at their root ends, allowing them to flap instead of bending, and thus eliminating the unfavorable bending action which takes place with rigidly connected blades. By the same token, the same gyroscopic forces which cause bending in the blades also have to be accounted for in the propeller shaft, engine, or any structure which supports the propeller. Thus, by hinging the blades and dissipating the bending forces, lighter blades, hub and supporting structure is made possible, with a consequent reduction or elimination of vibratory fatigue. At the same time rapid changes of the rotational and thrust axis are made possible without undue strain to the propeller and its related supporting structure. All the foregoing takes on added meaning when it is remembered that it is necessary to mount the propellers well ahead of the wing.

A further important feature of the present invention is the use of a constant speed universal joint as distinguished from a universal joint of the gimbal type wherein there is a periodic increase and decrease of speed at the driven side of the joint, this effect being amplified as the angle of the joint is increased. A propeller, or any rotating mass for that matter, which is subjected to a fluctuating rotational force will in time cause destruction due to fatigue, and more particularly is this true in the case of a multi-blade propeller since each blade element will in 360° of rotation speed up, increase thrust, reduce speed, and decrease thrust. A vibratory condition consisting of severe peaks in speed change would therefore result in the case of changing the angle of the rotational or thrust axis by means of the universal joint of the gimbal or other non-constant speed type. While it is true that these forces can be dissipated to a certain small extent through the use of the hinged blades of the present invention, the speed change is too rapid for the blades to accommodate themselves to the quickly changing regime. Furthermore, the combination of yawed propeller and fluctuating rotational speed would further increase destructive vibratory forces. Therefore, in the present invention, for smooth operation, a constant speed source of rotation is most desirable.

A further important feature of the invention is the provision of the axis of the constant speed universal joint in the plane of rotation of the propeller, as indicated in Fig. 9, as compared to the arrangement disclosed in the Bolas patent wherein the axis about which the rotational or thrust axis is changed is at a point inwardly of the plane of rotation of the propeller. In addition to the aerodynamic advantages gained, the present thrust axis tilting arrangement allows for a far wider range of angular change than would be permitted by the method shown in the Bolas patent wherein the practical limitations of structure, propeller clearance, extra weight and other complications involved would not permit such range of angular change. Therefore, by virtue of the arrangement of the present invention, as disclosed, it allows not only for increasing the speed range (low to high) performance but also reduces the ground angle at takeoff.

It should be pointed out that the term of "constant speed" as used in connection with the constant speed type of universal joint is not to be confused with constant speed as used in connection with a variable pitch propeller. In the case of the universal joint the term means that for a given R. P. M. the rotational velocity remains constant, this being a basic requirement for all rotating masses in order to eliminate vibration. Constant speed in connection with a variable speed propeller means changing the thrust of the propeller for a given R. P. M. and H. P. Thus by increasing the pitch or thrust and increasing the horsepower or manifold pressure, and vice versa, a given R. P. M. can be held. This is commonly referred to as a "constant speed" propeller.

Considering the case of the propeller operating in yaw, where the thrust fluctuates and where the blades are hinged such that the upcoming blade is allowed to dissipate the thrust, and/or the bending load by flapping forward, the vibratory fluctuations can also be further dissipated in the following manner. As the blade flaps forward, the pitch changing rod 93, as shown in Figs. 8 and 9, tend to hold the blade pitch changing arm 95 in the same position. Thus as the blade flaps forward it also rotates rearwardly, that is to say, reduces pitch, which in turn reduces flapping, and in this manner the blades are maintained in equilibrium with respect to each other, thereby dissipating the fluctuations and maintaining constant speed.

What is claimed is:

1. In an aircraft, a body, a wing structure, lift increasing means for said wing structure which in operative position normally diverts the air stream downwardly, a propeller means including at least a pair of laterally spaced counter-rotating propellers, one at each side of the longitudinal axis of the aircraft; each propeller including a hub, blades hingedly connected at their root ends to said hub about axes parallel to the plane of rotation of the propeller disc for relative flapping movement, and a pivotal mounting for said hub having a horizontal transverse pivot axis ahead of the wing structure about which the propeller thrust axis is tiltable between horizontal and downwardly tilted positions, said pivot axis coinciding with the center line of the plane of rotation of the propeller disc, said thrust axis at all times being in such forward relation to the chord of the wing structure that the wing structure and its lift increasing means is substantially centered in the projected disc area of the propeller slip stream; the major portion of said wing structure being at all times immersed in the slip streams of said propeller means; and an empennage supported to the rear of said wing structure so located that said slip streams cause the resultant air streams over the wing structure and its lift increasing means to bathe the empennage.

2. The invention as defined in claim 1, further characterized by blade centering damper means connected between said hub and said blades to limit and cushion said flapping movement.

3. The invention as defined in claim 1, further characterized by mounting means rotatably supporting said blades for pitch changing movement about their longitudinal axes, and pitch change actuating means connected to said blades to impart pitch changing movement thereto.

4. The invention as defined in claim 1, further characterized by mounting means rotatably supporting said blades for pitch changing movement about their longitudinal axes, pitch change actuating means connected to said blades to impart pitch changing movement thereto, a propeller drive shaft, and a governor means driven by said drive shaft operatively connected to said pitch change actuating means to affect constant speed variable pitch.

5. The invention as defined in claim 1, further characterized by a propeller drive shaft, universal joint means connecting said propeller means and said drive shaft, and means pivotally supporting said propeller means for tilting movement about a transverse axis to change its thrust axis, the axis of said universal joint and said transverse tilting axis being coincident to the propeller disc.

6. The invention as defined in claim 1, further characterized by a propeller drive shaft, constant speed universal joint means connecting said propeller means and said drive shaft, and means pivotally supporting said propeller means for tilting movement about a transverse axis to change its thrust axis, the axis of said universal joint and said transverse tilting axis being coincident to the propeller disc.

7. The invention as defined in claim 1, further characterized in that said universal joint is a constant speed joint.

8. The invention as defined in claim 1, further characterized by means connected to said pivotal mounting to impart tilting movement thereto about its horizontal transverse pivot axis to change the thrust axis, and interconnected means between said last named means and said lift increasing means to actuate the latter in conjunction with change in the thrust axis.

9. The invention as defined in claim 1, further characterized by a power plant carried beneath said body substantially coincident with the longitudinal axis of the aircraft, wing struts extending between said power plant and said wing structure at each side of said power plant, and drive means extending from said power plant through said struts and wing structure to said propellers respectively at each side of the longitudinal axis of the aircraft.

WILLIAM E. HUNT.

References Cited in the file of this patent

UNITED STATES PATENTS

| Number | Name | Date |
|---|---|---|
| 1,405,643 | Weaver | Feb. 7, 1922 |
| 1,861,491 | Capelis | June 7, 1932 |
| 1,933,307 | Bolas | Oct. 31, 1933 |
| 2,306,703 | Kost | Dec. 29, 1942 |
| 2,414,766 | Platt | Jan. 21, 1947 |
| 2,440,225 | Pullin | Apr. 20, 1948 |
| 2,541,704 | Koppen | Feb. 13, 1951 |
| 2,554,774 | Buivid | May 29, 1951 |